US010205970B2

(12) United States Patent
Krahnstoever et al.

(10) Patent No.: US 10,205,970 B2
(45) Date of Patent: Feb. 12, 2019

(54) SYSTEM, APPARATUS AND METHOD TO FACILITATE LIVE VIDEO STREAMING

(71) Applicant: Google Inc., Mountain View, CA (US)

(72) Inventors: Nils Oliver Krahnstoever, Brookline, MA (US); Thomas Edward DeWeese, Boxborough, MA (US); Michael A. Glover, Durham, NH (US)

(73) Assignee: GOOGLE LLC, Mountain View, CA (US)

( * ) Notice: Subject to any disclaimer, the term of this patent is extended or adjusted under 35 U.S.C. 154(b) by 28 days.

(21) Appl. No.: 15/261,167

(22) Filed: Sep. 9, 2016

(65) Prior Publication Data
US 2016/0381397 A1 Dec. 29, 2016

Related U.S. Application Data

(63) Continuation of application No. 13/445,588, filed on Apr. 12, 2012.

(51) Int. Cl.
*H04N 7/16* (2011.01)
*H04N 21/2183* (2011.01)
(Continued)

(52) U.S. Cl.
CPC ..... *H04N 21/2183* (2013.01); *H04N 21/2187* (2013.01); *H04N 21/23116* (2013.01);
(Continued)

(58) Field of Classification Search
None
See application file for complete search history.

(56) References Cited

U.S. PATENT DOCUMENTS

2003/0026422 A1   2/2003   Gerheim et al.
2004/0221237 A1   11/2004   Foote et al.
(Continued)

FOREIGN PATENT DOCUMENTS

CN   101803335 A   8/2010
CN   102244560 A   11/2011
(Continued)

OTHER PUBLICATIONS

1$^{st}$ Office Action for Chinese Patent Application No. CN 201380030606.3, dated Feb. 23, 2017, 23 Pages.
(Continued)

*Primary Examiner* — Samira Monshi
(74) *Attorney, Agent, or Firm* — Young Basile Hanlon & MacFarlane, P.C.

(57) ABSTRACT

Systems and methods for generating a master video stream from at least two live video streams are provided in this disclosure. The systems include a combination component that combines the live video streams to generate the master video stream. In one aspect, the live video streams can be copies of the same recording that are multicast from different locations according to User Datagram Protocol. The live video streams suffer different errors, such as stream corruption or stream error, due to the transmission. The combination component eliminates the errors in the live video streams due to transmission and creates a substantially error-free master video stream.

17 Claims, 15 Drawing Sheets

(51) Int. Cl.

| | | |
|---|---|---|
| *H04N 21/2187* | (2011.01) | |
| *H04N 21/231* | (2011.01) | |
| *H04N 21/242* | (2011.01) | |
| *H04N 21/63* | (2011.01) | |
| *H04N 21/8358* | (2011.01) | |
| *H04N 21/845* | (2011.01) | |
| *H04N 21/234* | (2011.01) | |
| *H04N 21/6405* | (2011.01) | |

(52) U.S. Cl.
CPC ..... *H04N 21/23424* (2013.01); *H04N 21/242* (2013.01); *H04N 21/631* (2013.01); *H04N 21/6405* (2013.01); *H04N 21/8358* (2013.01); *H04N 21/8456* (2013.01)

(56) References Cited

U.S. PATENT DOCUMENTS

| | | | |
|---|---|---|---|
| 2006/0181610 A1 | 8/2006 | Carlsson et al. | |
| 2007/0153679 A1 | 7/2007 | Jost et al. | |
| 2007/0237185 A1* | 10/2007 | Pereira | H04N 21/2389 370/503 |
| 2009/0082650 A1 | 3/2009 | Wilson et al. | |
| 2009/0251599 A1 | 10/2009 | Kashyap et al. | |
| 2010/0247079 A1 | 9/2010 | Zucker et al. | |
| 2011/0022471 A1 | 1/2011 | Brueck et al. | |
| 2011/0122315 A1* | 5/2011 | Schweiger | H04N 21/2365 348/500 |
| 2013/0222601 A1* | 8/2013 | Engstrom | G11B 27/034 348/159 |

FOREIGN PATENT DOCUMENTS

| | | |
|---|---|---|
| EP | 1748655 A2 | 1/2007 |
| EP | 2071749 A1 | 6/2009 |

OTHER PUBLICATIONS

Apostolopoulos, J. G., et al., "Path Diversity for Enhanced Media Streaming," IEEE Communications Magazine, IEEE Service Center, Piscataway, US, vol. 42, No. 8, Aug. 1, 2004 (Aug. 1, 2004), pp. 80-87.
Communication from the European Patent Office for EP Application Serial No. 13718978.3, dated Nov. 27, 2014, 2 pages.
Communication Pursuant to Article 94(3) EPC for European Patent Application No. EP 13718978.3, Sep. 30, 2015, 7 pages.
International Search Report and Written Opinion for International Application Serial No. PCT/US2013/036440, dated Nov. 12, 2013, 18 pages.
Ma, K. et al. "A Survey of Schemes for Internet-Based Video Delivery," Journal of Network and Computer Application, Academic Press, New York, NY, US, vol. 34, No. 5, Feb. 4, 2011 (Feb. 4, 2011), pp. 1572-1586.
Communication Pursuant to Article 94(3) EPC for European Patent Application No. EP 13718978.3, Jul. 13, 2016, 6 pages.
United States Office Action, U.S. Appl. No. 13/445,588, dated Oct. 6, 2016, 22 pages.
United States Office Action, U.S. Appl. No. 13/445,588, dated Jun. 2, 2016, 22 pages.
United States Office Action, U.S. Appl. No. 13/445,588, dated Nov. 5, 2015, 11 pages.
United States Office Action, U.S. Appl. No. 13/445,588, dated Jun. 5, 2015, 13 pages.
United States Office Action, U.S. Appl. No. 13/445,588, dated Feb. 27, 2015, 11 pages.
United States Office Action, U.S. Appl. No. 13/445,588, dated Feb. 14, 2014, 12 pages.
United States Office Action, U.S. Appl. No. 13/445,588, dated Oct. 9, 2013, 10 pages.

* cited by examiner

SYSTEM, APPARATUS AND METHOD TO FACILITATE LIVE VIDEO STREAMING

CROSS-REFERENCE TO RELATED APPLICATIONS

This application is a continuation of U.S. patent application Ser. No. 13/445,588 filed on Apr. 12, 2012, the disclosure of which is incorporated by reference in its entirety.

TECHNICAL FIELD

This disclosure relates to media streaming and, more particularly, to utilizing digital video streams for live video streaming.

BACKGROUND

Media sharing services have become prolific on the internet as connection speeds have increased giving consumers the ability to upload, for example, their own personal videos. Most media sharing services act strictly as an intermediary, for example, they give the user a forum to display the user's version of a video. The media sharing service can then host the user uploaded media allowing other users on the internet the ability to view the uploaded media. Media sharing services are also capable of streaming media from a live event. For example, a media sharing service could host a live sporting event capable of being displayed to users of the media sharing service.

Media sharing services often receive live video streams over networks via protocols that are subject to stream corruption or stream error. The stream corruption or stream error may cause visible artifacts during playback. Even worse, the stream corruption or stream error, in some circumstances, may even cause subsequent decoder systems to crash.

SUMMARY

The following presents a simplified summary of the specification in order to provide a basic understanding of some aspects of the specification. This summary is not an extensive overview of the specification. It is intended to neither identify key or critical elements of the specification nor delineate any scope of particular embodiments of the specification, or any scope of the claims. Its sole purpose is to present some concepts of the specification in a simplified form as a prelude to the more detailed description that is presented later.

In accordance with one or more embodiments and corresponding disclosure, various non-limiting aspects are described in connection with providing a live video stream.

In accordance with a non-limiting embodiment, a system is provided that includes at least one media content generator that generates at least two live video streams. The at least two live video streams are combined by a combination component. The combination component generates a master video stream from the combined at least two live video streams. According to an aspect, the system further includes a synchronization component that synchronizes the at least two live video streams. The synchronization component synchronizes the at least two live video streams, to facilitate their combination, by matching fingerprints or other metadata of various segments.

According to a further non-limiting embodiment, a method for generating a master video stream is provided. At least two live video streams are received and combined. The master video stream is generated from the combination of the at least two live video streams. According to an aspect, the master video stream is substantially error free. The substantially error free master stream is generated by correcting at least two live video streams that each may suffer stream corruption or stream errors or be subject to other forms of digital errors, such as corrupted or repeated data. The stream corruption or stream errors of the at least two live video streams are corrected by matching fingerprints of the packets in the at least two live video streams and replacing lost packets in one data stream with corresponding packets of the other data stream.

In another non-limiting embodiment, a computer-readable storage medium is provided that can perform operations that facilitate generation of a master video stream. The operations include receiving at least two live video streams and generating a master video stream by combining the at least two live video streams. According to an aspect, the operations further include assigning weights to the at least two live video streams and combining the at least two live video streams according to the assigned weights. The weights can be assigned based on an originating location, a reliability, or any other parameter of the video streams that can be compared.

The following description and the drawings set forth certain illustrative aspects of the specification. These aspects are indicative, however, of but a few of the various ways in which the principles of the specification may be employed. Other advantages and novel features of the specification will become apparent from the following detailed description of the specification when considered in conjunction with the drawings.

BRIEF DESCRIPTION OF THE DRAWINGS

Numerous aspects, embodiments, objects and advantages of the present invention will be apparent upon consideration of the following detailed description, taken in conjunction with the accompanying drawings, in which like reference characters refer to like parts throughout, and in which.

DETAILED DESCRIPTION

Figure 1:
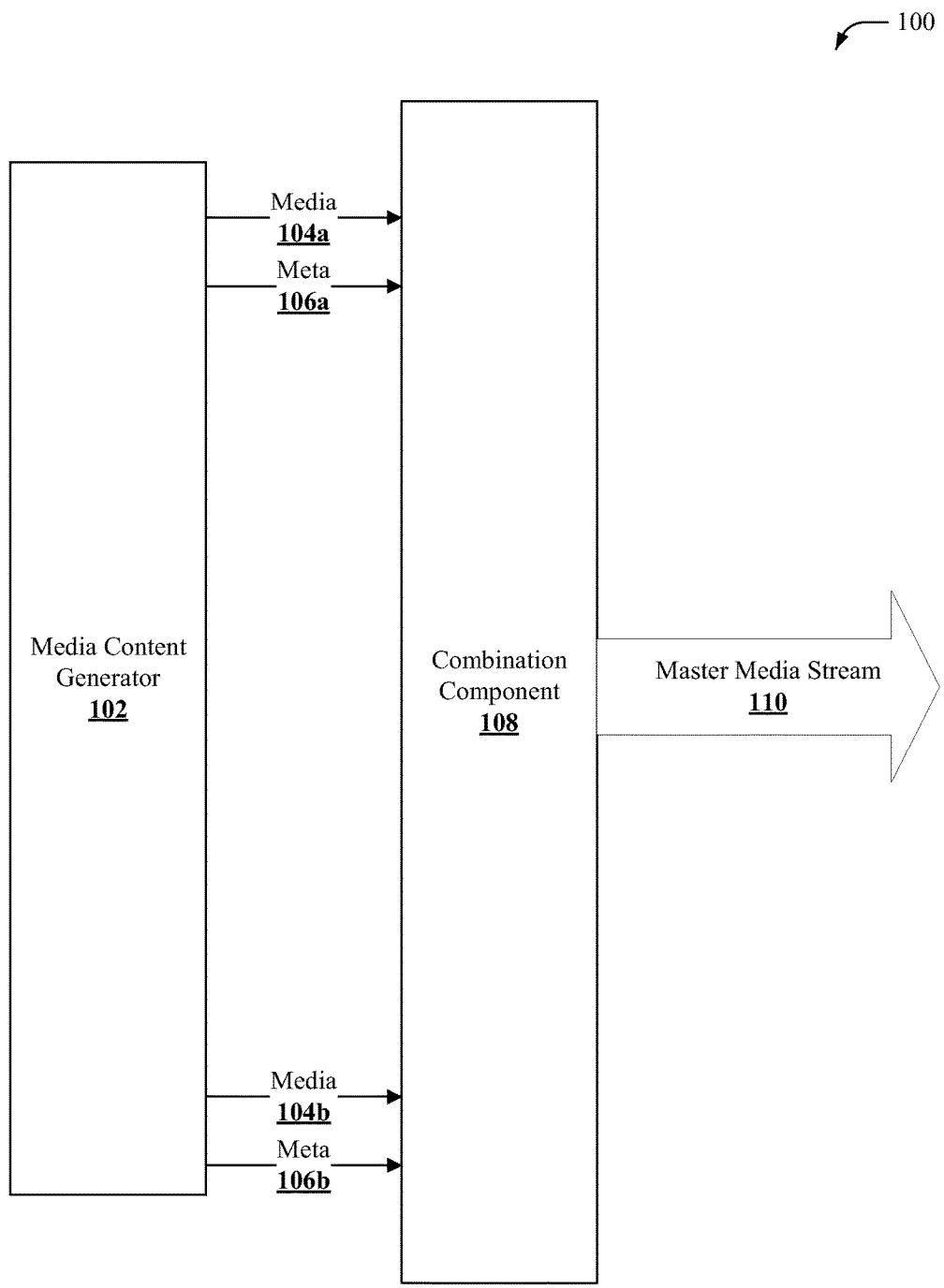
FIG. 1 illustrates an example non-limiting system that facilitates generation of a master media stream, in accordance with various aspects and implementations described herein.

Various aspects or features of this disclosure are described with reference to the drawings, wherein like reference numerals are used to refer to like elements throughout. In this specification, numerous specific details are set forth in order to provide a thorough understanding of this disclosure. It should be understood, however, that the certain aspects of disclosure may be practiced without these specific details, or with other methods, components, materials, etc. In other instances, well-known structures and devices are shown in block diagram form to facilitate description and illustration of the innovation.

It is to be appreciated that in accordance with one or more embodiments or implementations described in this disclosure, multiple copies of a live video stream can be received over a network. When used herein, the term "video stream" will be understood as referring to a live video stream. The multiple copies of the video stream can each suffer various stream corruptions or errors. The stream corruptions or errors in the multiple copies of the video stream can be corrected and the corrected video stream can be stored and served to end-users. The corrected video stream eliminates visible artifacts and other problems associated with stream corruption or stream errors.

Referring now to the drawings, with reference initially to FIG. 1, a system 100 that facilitates generation of a master video stream is presented. Aspects of the systems, apparatuses or processes explained in this disclosure can constitute machine-executable component(s) embodied within machine(s), e.g., embodied in one or more computer readable mediums (or media) associated with one or more machines. Such component(s), when executed by the one or more machines, e.g., computer(s), computing device(s), virtual machine(s), etc. can cause the one or more machines to perform the operations described. System 100 can include memory for storing computer executable components and instructions and one or more processors can facilitate operation of the computer executable components and instructions by the system 100.

In an embodiment, system 100 can include one or more media content generators 102 and a combination component 108. System 100 represents a system that can be employed in one or more computers or devices in one or more data centers to provide a master media stream 110. The one or more media content generators 102 generate at least two media streams 104a, 104b. Although generation of just two data streams is illustrated, it will be understood that the one or more media content generators 102 can generate any number (N) of media streams greater than or equal to two. According to an embodiment, the number of media streams generated can be four (N=4). According to another embodiment, the number of media streams generated can be any odd number greater than 3 (N>3). In an embodiment, the media streams 104a, 104b can be identical copies of each other. According to another embodiment, the media streams 104a, 104b can be different from each other (e.g., the media streams 104a, 104b can be encoded differently from each other).

The master media stream 100 can be substantially error free through combination of two or more media streams 104a, 104b by the combination component 108. The combination component 108 can utilize footprints or other metadata 106a, 106b associated with the media streams 104a, 104b to match various segments or packets of the media streams 104a, 104b to facilitate the combination. The combination component 108 can utilize match segments of the media streams 104a, 104b and replace lost segments of one media stream 104a or 104b with complete segments of another media stream 104a or 104b.

As used herein, the term "media" can include any multimedia data. Examples of multimedia data include but are not limited to: video data, audio data, video game data, or any other type of data that can be streamed. The term "segment," as used herein, refers to any part of a media stream. For example, a segment of the media stream can be a packet of a video stream that is transmitted via User Datagram Protocol (UDP). Digital video streams are often transmitted over networks via unreliable protocols, like UDP, that are subject to stream corruption or stream errors. Digital video streams are divided into packets or datagrams and transmitted according to UDP; however, UDP does not provide for sequencing the packets for reassembly of the digital video streams. The inability to sequence the packets leads to stream corruption or stream errors. During playback of the digital video stream, stream corruption or stream errors can cause visible artifacts. In some situations, the stream corruption or stream errors can cause subsequent decoder systems to crash. It will be understood that a segment of a media stream can refer to any part of the media stream that is transmitted via any protocol from a source to a destination. For example, the media stream can be transmitted across a more reliable protocol, such as TCP/IP.

Figure 2:
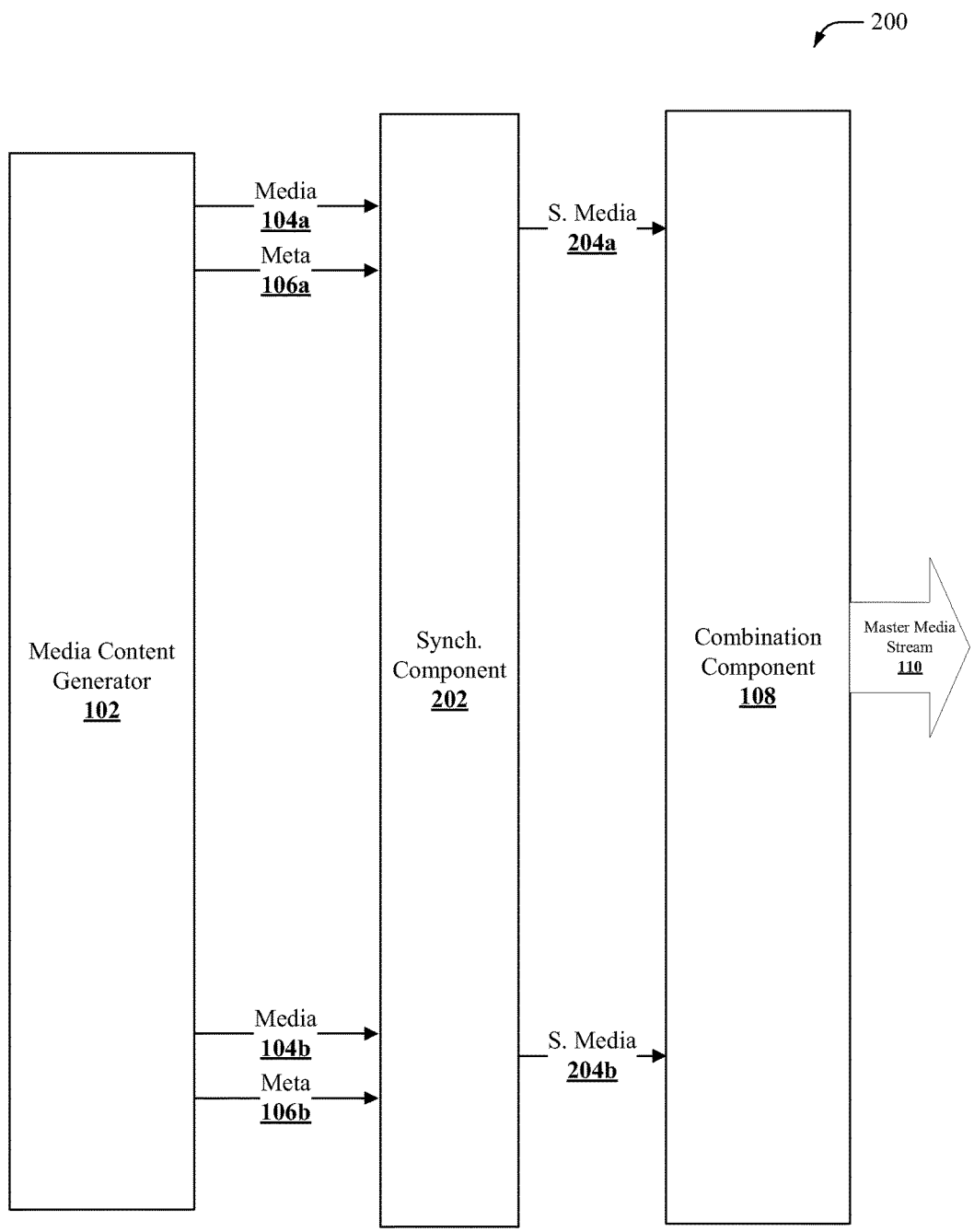
FIG. 2 illustrates an example non-limiting system that synchronizes at least two media streams to facilitate combination of the at least two live video streams, in accordance with various aspects and implementations described herein.

Referring now to FIG. 2, illustrated is a system 200 that synchronizes at least two media streams 104a, 104b to facilitate combination of the at least two live video streams 104a, 104b. According to an embodiment, system 200 can include one or more media content generators 102, a synchronization component 202, and a combination component 108. The one or more media content generators provide two or more media streams 104a, 104b. The two or more media streams 104a, 104b and fingerprints or other metadata 106a, 106b associated with the media streams 104a, 104b are sent to the synchronization component 202. The synchronization component can synchronize the at least two live video streams 104a, 104b to facilitate combination of the at least two live video streams 104a, 104b into a master media stream 110 by the combination component 108.

In an embodiment, the synchronization component 202 can match a fingerprint or other associated metadata 104a of a segment of a media stream 104a to a fingerprint or other associated metadata 104b of a corresponding segment of another media stream 104b. When used herein, "fingerprints" refer to metadata associated with a set of data packets of a segment of a media stream. The synchronization component 202 creates synchronized media streams 204a, 204b that are sent to the combination component 108 to facilitate generation of the master media stream 110.

The systems 100 and 200 of FIGS. 1 and 2 can be utilized in the generation of a master media stream 110 from two or more of any type of media stream. FIGS. 3-10 illustrate embodiments and aspects of the disclosure with respect to a specific example: a video stream. It will be understood that the embodiments and aspects described with respect to a video stream in FIGS. 3-10 can be employed with any media stream in the systems 100 and 200 of FIGS. 1 and 2.

Figure 3:
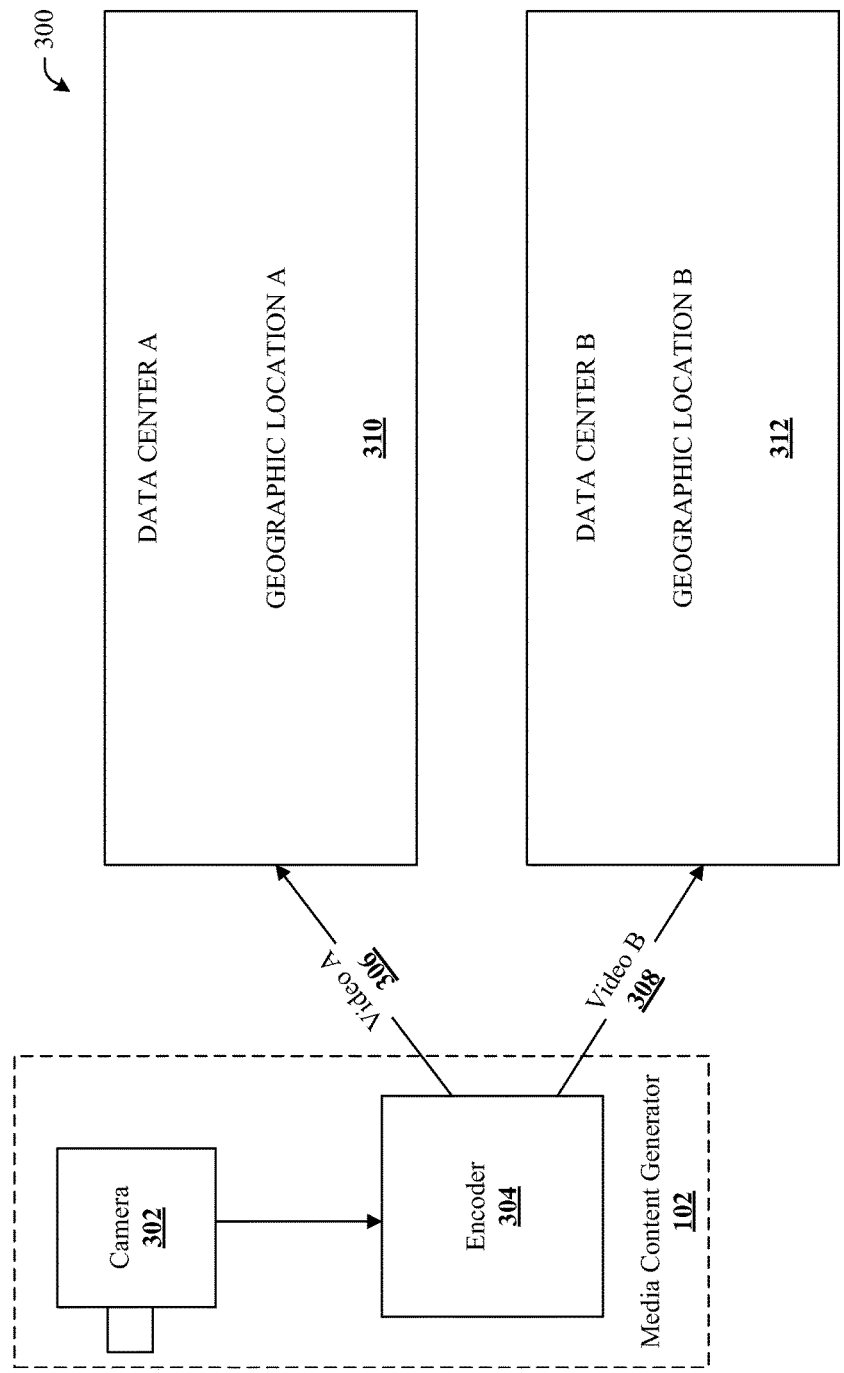
FIG. 3 illustrates an example non-limiting depiction of the generation of at least two live video streams, in accordance with various aspects and implementations described herein.

Illustrated in FIG. 3 is an example non-limiting depiction 300 of the generation of at least two live video streams 306, 308. The at least two live video streams 306, 308 can be generated by a media content generator 102. The media content generator 102, according to an embodiment, can include a camera 302 and an encoder 304.

The camera 302 can record video data related to any event. For example, the camera can record video data of a live event. According to an embodiment, the live event can be a sporting event. However, the event need not be limited to a live event.

The video data can be sent to an encoder 304 that can encode the video data for transmission across a protocol to at least two data centers (data centers A and B as shown in FIG. 3). For example, data center A can receive a video stream A 306 from the encoder 304, while data center B can receive a separate video stream B 308 from the encoder 304.

Data center A is located at geographic location A 310. Similarly, data center B is located at geographic location B 312. Geographic location A and geographic location B, according to an embodiment, can be located remotely from each other. For example, geographic location A can be in North America, while geographic location B can be in Europe. However, it will be understood that geographic locations A and B need not be located remotely from each other. For example, geographic locations A and B can both be located in the same facility in the United States, but the geographic locations A and B can correspond to different hardware or software that receive the different video streams 306, 308.

Figure 4:
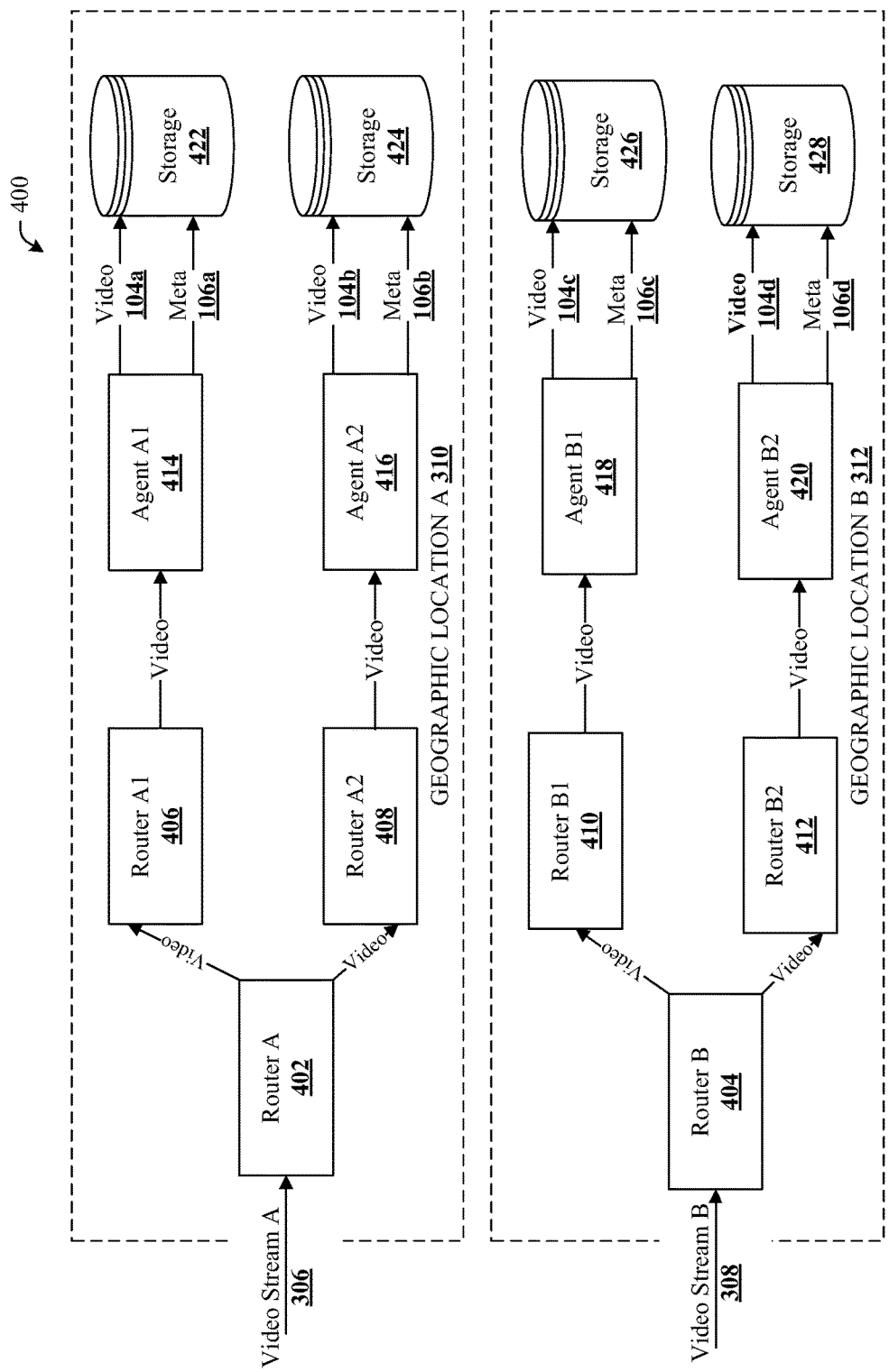
FIG. 4 illustrates an example non-limiting depiction of the processing of video streams at different geographic locations, in accordance with various aspects and implementations described herein.

FIG. 4 illustrates an example non-limiting depiction 400 of the processing of video streams 306, 308 at the different data centers located at different geographic locations A and B 310, 312. Data center A at geographic location A 310 includes a router (Router A) 402 that sends the video stream 306 to another router (Router A1) 406 for further distribution. The router (Router A) 402 also sends a copy of the video stream 306 to still another router (Router A2) 408. The routers (Router A1 and Router A2) 406 and 408 facilitate transmission of the corresponding video stream 306 and copy of the video stream 306 to corresponding agents (Agent A1 and Agent A2) 414 and 416.

"Agents" are different "destination points" for the video stream 306 and the copy of the video stream 306 and are associated with storage devices 422, 424 that provide at least temporary storage of video segments 104a, 104b corresponding to video stream 306 or the copy of the video stream 306 and associated metadata 106a, 106b. The storage 422, 424 can be memory or disk based. According to an embodiment, disk based storage is utilized because disk based storage provides a higher degree of reliability since the disk based storage is persistent even in the presence of agent 414, 416 failure.

The agents (Agent A1 and Agent A2) 414 and 416 determine fingerprints or other metadata associated with packets of the video stream 306 and the copy of the video stream 306. Packets of the video stream 104a, 104b and the associated fingerprints or other metadata 106a, 106b are at least temporarily stored in storage devices 422 and 424 at different locations within geographic location A 310. As a non-limiting example, if geographic location A 310 were the United States, router 402 can be located in New York City, while router 406, agent 414 and storage device 422 can be located in New York City and router 406, agent 416 and storage device 424 can be located in Boston. It will be understood that the United States, New York City and Boston can be any country, state, province, or territory.

In a non-limiting example, video stream A 306 and the copy of video stream A can be multicast via UDP or UDP over network tunnels to the various routers 402, 406, 408 or agents 414, 416. According to an embodiment, the video stream A 306 and the copy of video stream A 306 can be received as encapsulated MEG2 Transport Streams (M2TS), which can be further encapsulated by real time transfer protocol (RTP). However, other formats, such as flash video (FLV) over real time messaging protocol (RTMP) are possible.

At each transmission, the video stream A 306 and the copy of video stream A 306 can suffer stream corruption or stream errors. When used herein, "stream corruption or stream errors" refer to video segments that are missing, corrupt, or otherwise damaged. The stream corruption or stream errors of video stream A 306 and the copy of video stream A 306 are assumed to be independent. In other words, video stream A 306 suffers stream corruption or stream errors that do not correlate with the stream corruption or stream errors of the copy of video stream A 306. Similarly, the stream corruption or stream errors of video stream A 306 are assumed to be independent of the stream corruption or stream errors of video stream B.

Similarly to the data center located at location A 310, the data center located at location B 312 includes a router (Router B) 404 that sends the video stream 308 to another router (Router B1) 410 for further distribution. The router (Router B) 404 also sends a copy of the video stream 308 to another router (Router B2) 412. The routers (Router B1 and Router B2) 410 and 412 facilitate transmission of the corresponding video stream 308 and copy of the video stream 308 to corresponding agents (Agent B1 and Agent B2) 418 and 420. According to an embodiment, the video stream B 308 and the copy of video stream B 308 can be received as encapsulated MEG2 Transport Streams (M2TS), which can be further encapsulated by real time transfer protocol (RTP). However, other formats, such as flash video (FLV) over real time messaging protocol (RTMP) are possible.

The agents (Agent B1 and Agent B2) 418 and 420 determine fingerprints or other metadata associated with packets of the video stream 308 and the copy of the video stream 308. Packets of the video stream 104c, 104d and the associated fingerprints or metadata 106c, 106d are stored in storage devices 426 and 428 at different locations within geographic location B 312.

In a non-limiting example, similarly to video stream A 306, video stream B 308 and the copy of video stream B 306 can be multicast via UDP or UDP over network tunnels to the various routers 404, 410, 412 or agents 418, 420. At each transmission, the video stream B 308 and the copy of video stream B 308 can suffer stream corruption or stream errors. The stream corruption or stream errors of video stream B 308 and the copy of video stream B 308 are assumed to be independent. In other words, video stream B 308 suffers stream corruption or stream errors that do not correlate with the stream corruption or stream errors of the copy of video stream B 308. The stream corruption or stream errors of video stream B 308 are also assumed to be independent of the stream corruption or stream errors of video stream A 306.

Figure 5:
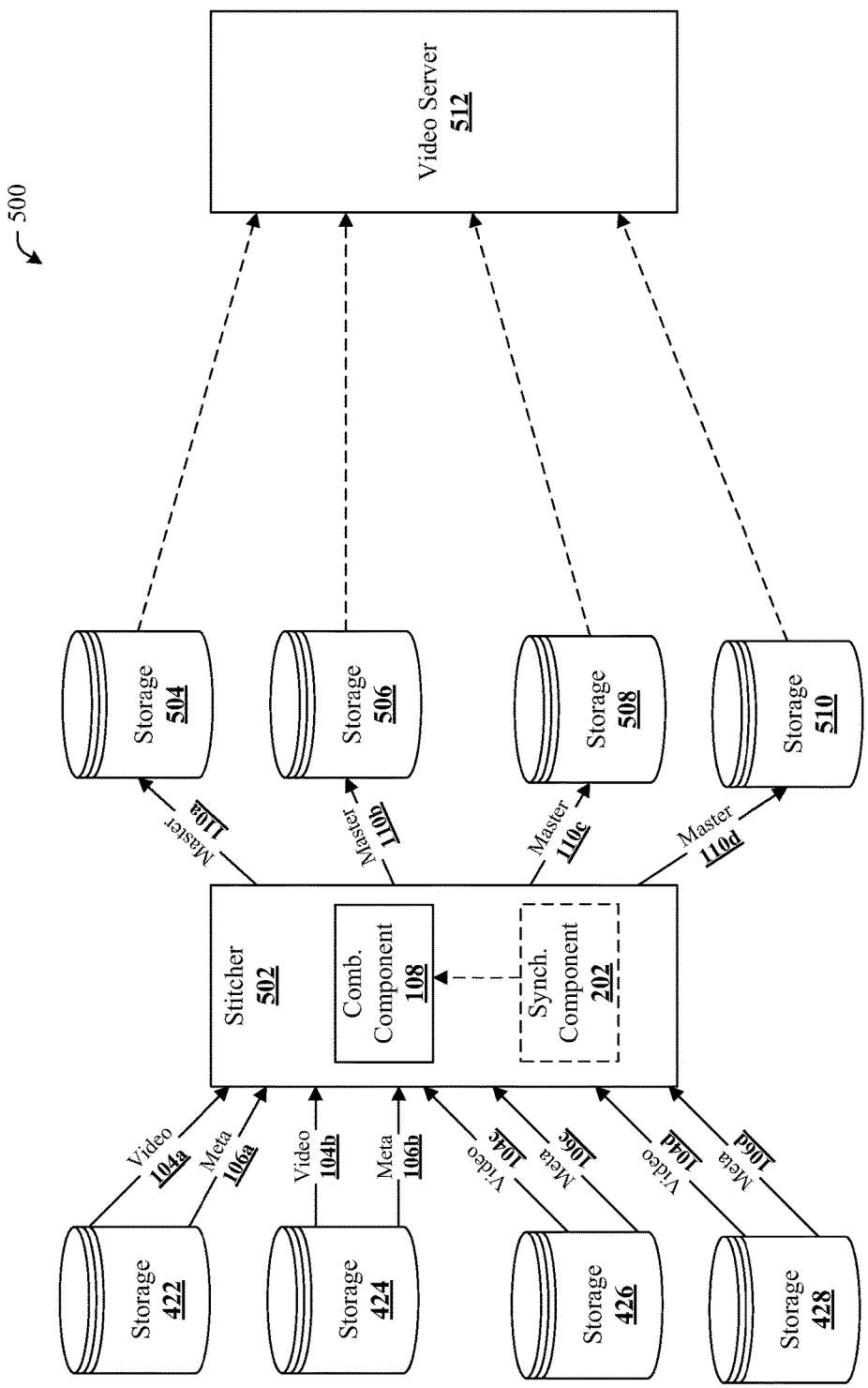
FIG. 5 illustrates an example non-limiting system that facilitates service of a master video stream to an end-user, in accordance with various aspects and implementations described herein.

The depictions 300 and 400 of FIGS. 3 and 4 can be utilized in connection with system 500 of FIG. 5 to facilitate service of a master video stream 110a, 110b, 110c, 110d to an end-user. The system includes a stitcher 502 that fetches the potentially corrupt video streams 104a, 104b, 104c, 104d, detects errors, and corrects the errors. According to an embodiment, the stitcher 502 can correct errors by replacing a packet with errors with an error free packet from a different stream. In another embodiment, the stitcher 502 can facilitate correction of the error in the stream. The stitcher 502 includes the combination component 108 as described with regard to FIG. 1. Optionally, according to an embodiment, the stitcher 502 can also include the synchronization component 202, as described with regard to FIG. 2.

The stitcher 502 can receive video streams 104a, 104b, 104c, 104d and associated fingerprints or other metadata 106a, 106b, 106c, 106d from different locations. According to an embodiment, the stitcher can receive video 104a, 104b and corresponding fingerprints or other metadata 106a, 106b from storage 422 and 424 from data location A of FIG. 4 and receive video 104c, 104d and corresponding fingerprints and other metadata 106a, 106b from storage 426 and 428 of data center B of FIG. 4.

The combination component 108 of the stitcher 502 can combine the video streams 104a, 104b, 104c, 104d to detect and eliminate errors in the video streams 104a, 104b, 104c, 104d. The combination component 108 can detect corrupt segments, missing segments, duplicated segments, and spurious segments. According to an embodiment, the combination component 108 does not need to detect the specific type of error. For example. The combination component 108 can detect corrupt segments and spurious segments as the same kind of "noise."

The combination component 108 can eliminate any detected stream corruption or stream errors or errors and produce redundant master copies 110a, 110b, 110c, 110d that are sent to storage devices 504, 506, 508, 510. Although the storage devices 504, 506, 508, 510 are illustrated as separate storage devices from storage 422, 424, 426, 428, it will be understood that the storage devices can be the same (e.g., storage 422 corresponds to storage 504, storage 424 corresponds to storage 506, storage 426 corresponds to storage 508, storage 428 corresponds to storage 508).

The redundant master copies 110a, 110b, 110c, 110d do not suffer from stream corruption or stream errors in video streams 104a, 104b, 104c, 104d. The combination component 108 combines video streams 104a, 104b, 104c, 104d to eliminate any stream corruption or stream errors so that the master copies 110a, 110b, 110c, 110d are substantially error free. According to an embodiment, the synchronization component 202 can synchronize the video streams 104a, 104b, 104c, 104d according to the associated fingerprints or metadata 106a, 106b, 106c, 106d. The synchronization component 202 can facilitate the combination of the video streams 104a, 104b, 104c, 104d by the combination component 108 into the redundant master video streams 110a, 110b, 110c, 110d.

The system 500 also includes a video server 512 that can facilitate service of one of the redundant mater video streams 110a, 110b, 110c, 110d to an end-user, The video server 512 can access any storage location 504, 506, 508, 510 to facilitate service. According to an embodiment, the video server can access a storage location 504, 506, 508, 510 according to load of each storage location, reliability of each storage location, location of each storage location, a predefined access schedule for each storage location, or any other parameter that can be used to determine which of the storage locations can serve the video feed to the end-users quickly and accurately.

Figure 6:
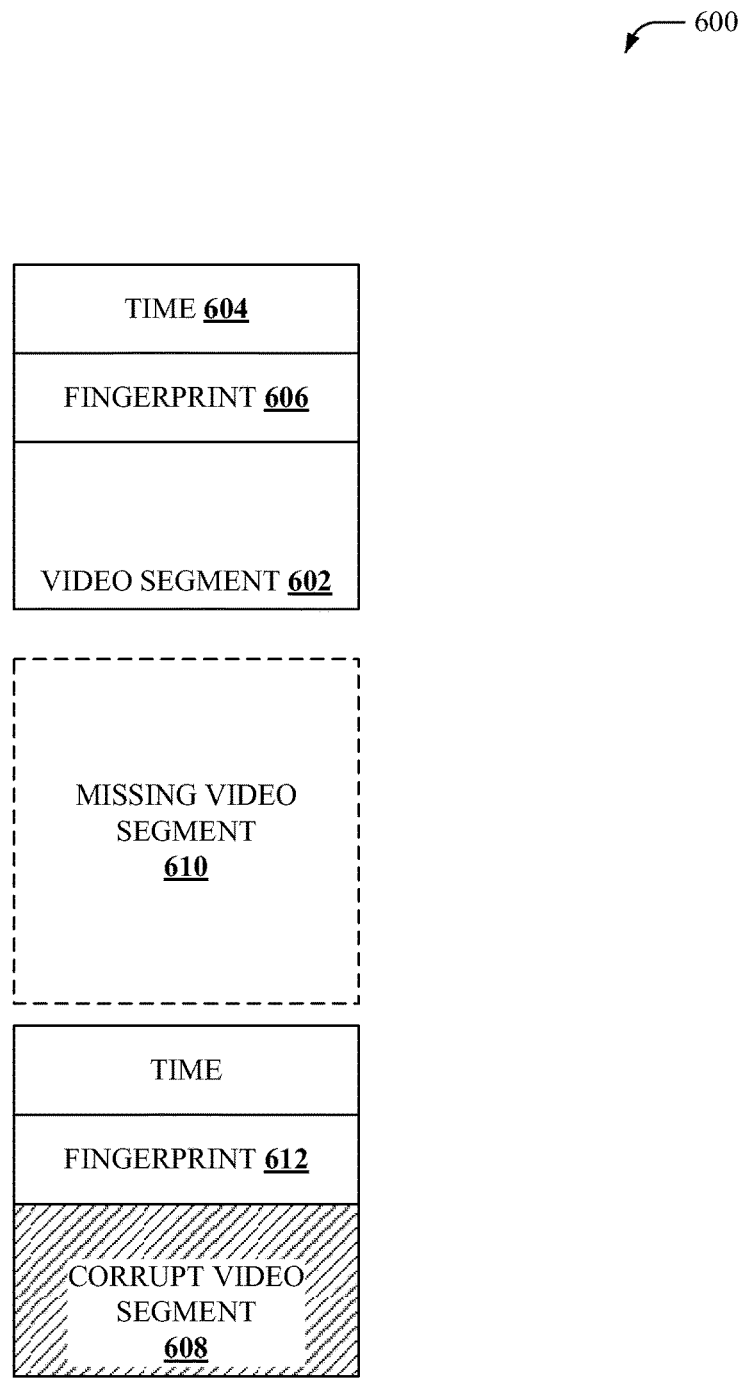
FIG. 6 illustrates an example non-limiting depiction of a legend showing different types of packets transmitted in a video stream, in accordance with various aspects and implementations described herein.
Figure 7:
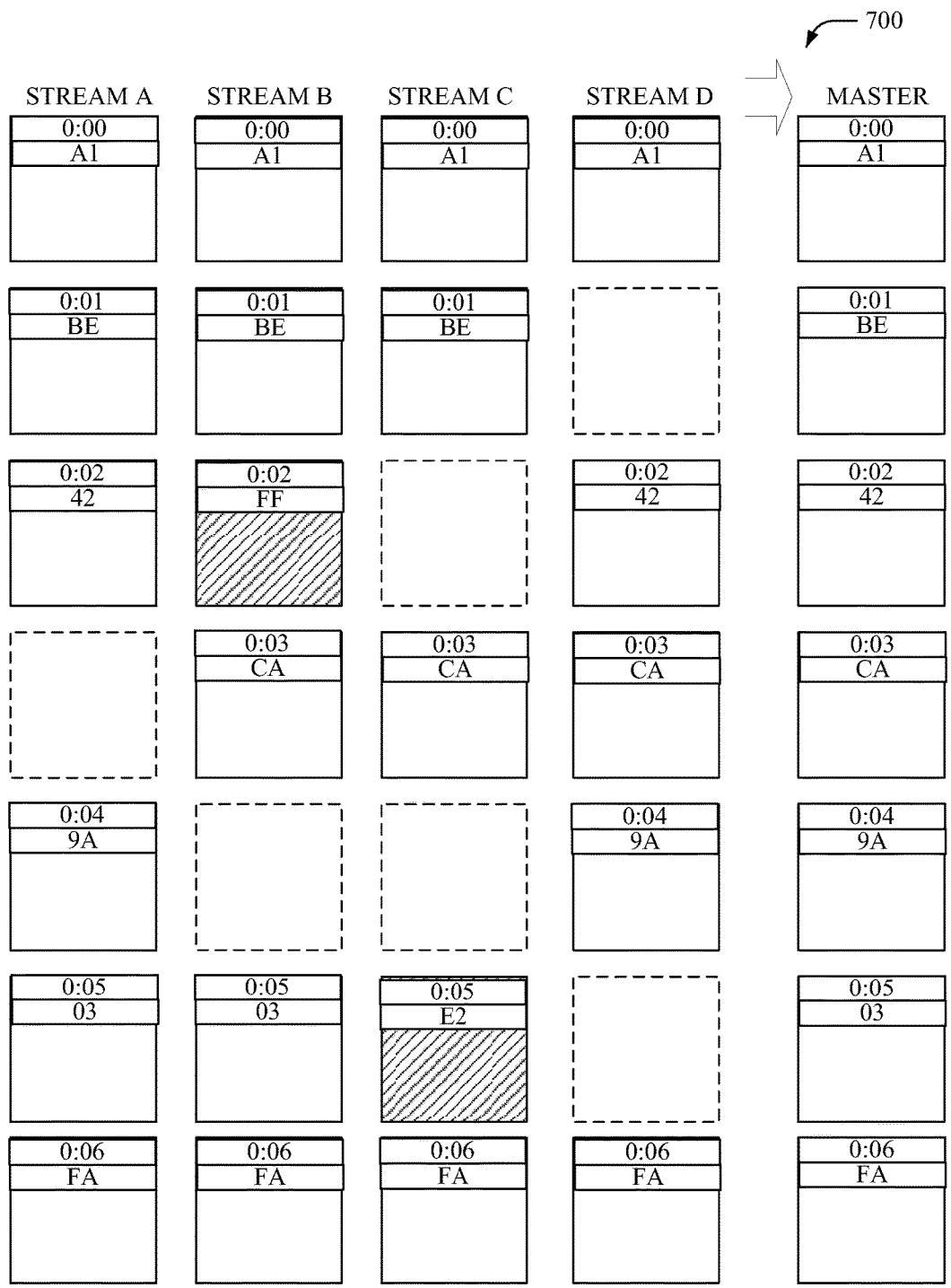
FIG. 7 illustrates an example non-limiting depiction of different video streams with different stream corruption or stream errors that are utilized in the generation of a master video stream, in accordance with various aspects and implementations described herein.

FIGS. 6 and 7 illustrate depictions 600, 700 of different video streams with different stream corruption or stream errors that can be used to generate a substantially error free master video stream. FIG. 6 illustrates a legend 600 of the different types of segments or packets present in a data stream. For each segment, a video stream is assumed to have either a video segment 602 without errors or a stream corruption or stream error. Although many types of stream corruption or stream error can exist, any stream corruption or stream error is assumed to fall into the category of either a corrupt video segment 608 or a missing video segment 610. Corrupt video segments 608 can include any video segment that is corrupt, repetitive, spurious, or the like. According to another embodiment, certain errors can be ignored.

According to an embodiment, the video segment 602 without errors can include a fingerprint 606. The corrupt video segment 608 can also include a fingerprint 614, but fingerprint 614 can be different from a fingerprint that would be given to the same segment with no errors or corruption. According to an embodiment, the packet can be an abstract or reduced-size value that represents the content. However, the fingerprint does not have to be an abstract or reduced-size value that represents the content. In another embodiment, the packet can be a portion of the content or the entire content.

The video segment 602 without errors can also include additional metadata. According to an embodiment, the additional metadata can include a time stamp 604.

FIG. 7 illustrates a depiction 700 of different video streams with different stream corruption or stream errors that are utilized in the generation of a master video stream. The master video stream is substantially error free, even though the different video streams each show different stream corruption or stream errors.

Figure 8:
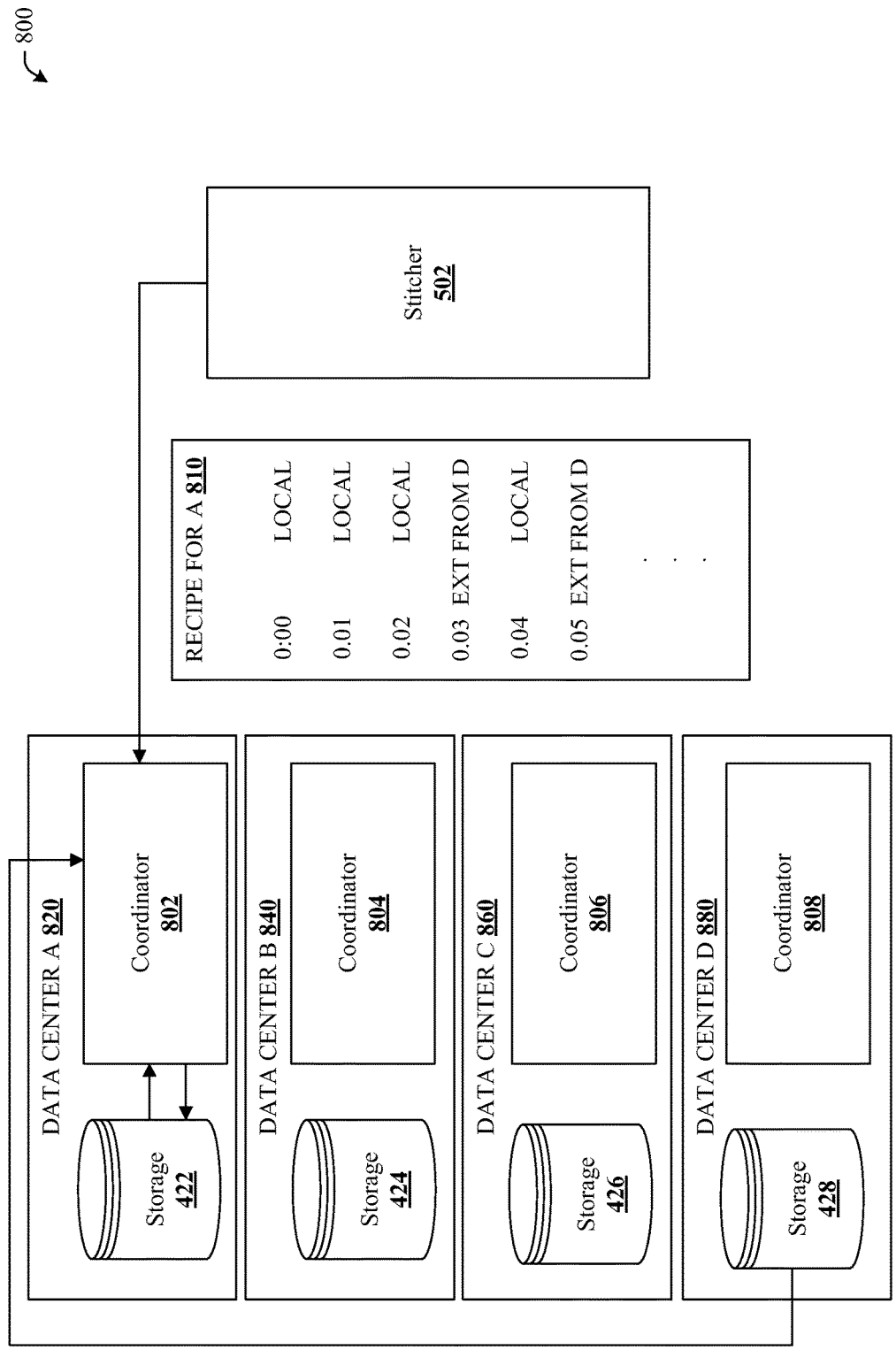
FIG. 8 illustrates an example non-limiting system that facilitates the generation of a master video stream at a data center by combing video streams according to a recipe, in accordance with various aspects and implementations described herein.

Referring now to FIG. 8, illustrated is a system 800 that facilitates the generation of a master video stream 110 at a data center by combing video streams according to a recipe 810. System 800 includes the stitcher 502 described with respect to FIG. 5. The stitcher receives video streams from storage 422, 424, 426, 428 located at different data centers 820, 840, 860, 880. The stitcher 502 performs a deterministic segmentation of the video streams. According to an embodiment, the stitcher 502 detects certain distinguishing marks in the video stream that trigger the creation of a segment boundary. Different segmentation approaches can be employed. According to an embodiment, sequences of segments can be combined into longer video segments if packets of a video stream are very small or determined to be unimportant.

The stitcher 502 can employ the comparison component 108 to compare the different segments of the video streams and perform a correction for any segments that exhibit errors. According to an embodiment, the comparison can be done in a segment-by-segment manner. The segment-by-segment comparison allows the stitcher 502 to determine if two or more packets are equal or unequal. The comparison is made efficient by not comparing the actual segment contents, but by comparing fingerprints or other metadata of the segment content. For example, the metadata can include a time code of the segment, a time code of the following segment, and a hash code of the content. In another embodiment, if a metadata-based comparison is unavailable, for example because the incoming streams are not bit identical, video content based similarity metrics can be employed. Examples of content based similarity metrics include image to image matching, histogram based matching, feature based matching, compressed domain based matching, or the like.

Comparing the segments based on fingerprints or other metadata allows the stitcher 502 to avoid the fetching of actual video segments from the data centers 820, 840, 860, 880 (or agents at the data centers 820, 840, 860, 880). Instead, the stitcher 502 need only fetch a fingerprint or other metadata representation of the video segments, which makes the stitcher 502 efficient both in terms of network bandwidth and CPU utilization. The actual fetching of video data is delayed until the comparison is complete and the stitcher 502 needs to find a copy of each segment of the master video stream 110.

According to an embodiment, the stitcher can create a recipe 810 for creation of the master video stream 110 to each data center 820, 840, 860, 880. Only creation of the master video stream 110 at data center A 820 will be described. However, it will be understood that similar recipes can be created for each data center. The recipe 810 can be sent to a coordinator 802 at the data center 820. Each data center 840, 860, 880 has a corresponding coordinator 804, 806, 808 that can operate similarly.

The coordinator 802 can retrieve video segments corresponding to the recipe 810. The recipe 810 uses locally stored segments whenever possible. Only when a stream corruption or stream error occurs in a locally stored packet does the recipe 810 call for an externally stored segment.

Figure 9:
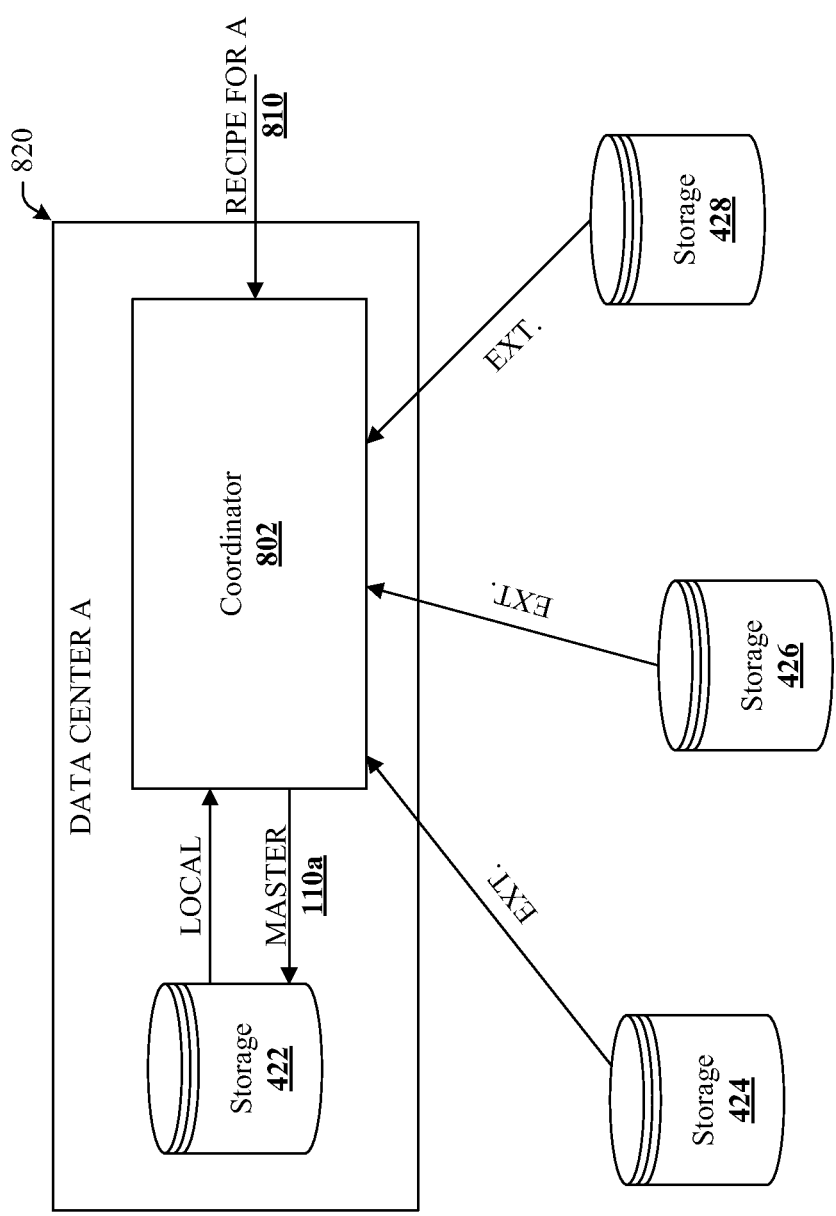
FIG. 9 illustrates an example non-limiting system that generates a master video stream by replacing packets in a local video stream with packets from external video streams, in accordance with various aspects and implementations described herein.

Although only one external data center (data center D 880) is shown as providing external packets to the coordinator of data center A 820, it will be understood that all of the other data centers 840, 860, 880 can provide external packets to data center A 820. As shown in FIG. 9, the external packets can be retrieved from any external data center according to the recipe 810.

Figure 10:
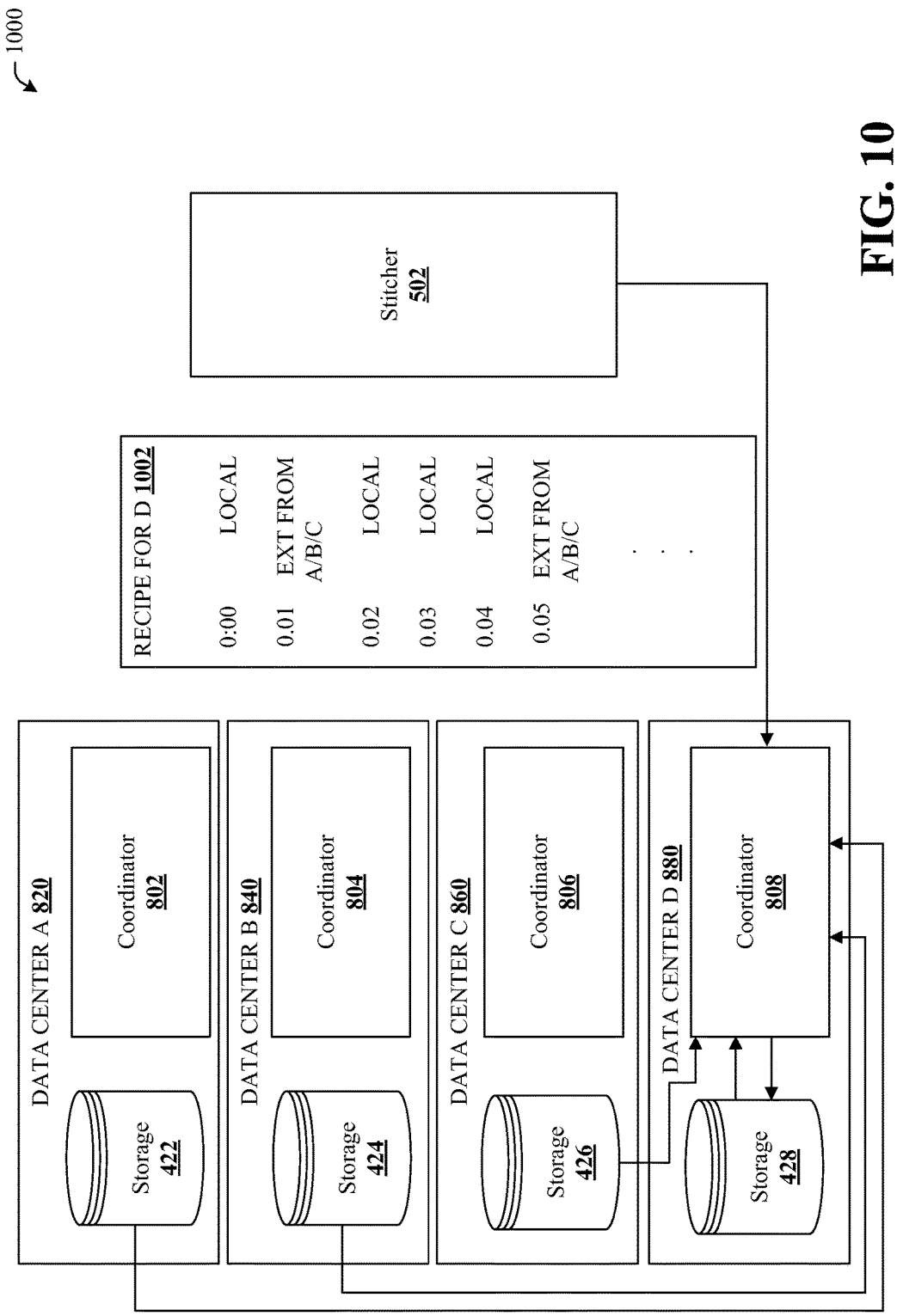
FIG. 10 illustrates an example non-limiting system that facilitates the generation of a master video stream at a data center by compensating for stream corruption or stream errors in a local video stream with packets from external video streams according to a recipe, in accordance with various aspects and implementations described herein.

FIG. 10 illustrates a system 1000 that is similar to system 800. System 1000 facilitates the generation of a master video stream at data center D 880 by compensating for stream corruption or stream errors in a local video stream with packets from external video streams according to a recipe 1002. The recipe 1002 retrieves an external segment when a segment experiences stream corruption or stream error or other error, but defaults back to the local copy when there is no error.

Each other data center 820, 840, 860 is accessible to coordinator 808. The recipe indicates that the external segment can come from data center A 820, data center B 840, or data center C 860. According to an embodiment, choice of the data center to provide the external segment can be based on schedule for switching between external data sources. In another embodiment, the choice of the data center to provide the external segment can be based on a weight given to the different data centers 820, 840, 860. The weight can be based on any parameter of the data center, such as, location, reliability, load, or the like. In the case of the weight being based on location, data center C 860 can have a higher weight than data centers A and B 820 and 840 because data center C 860 is in the same geographic location as data center D 880. However, if there is a general outage in the geographical location, data centers A and B 820 and 840 that are located at a different geographical location can have a greater weight than data center C 860.

Figure 11:
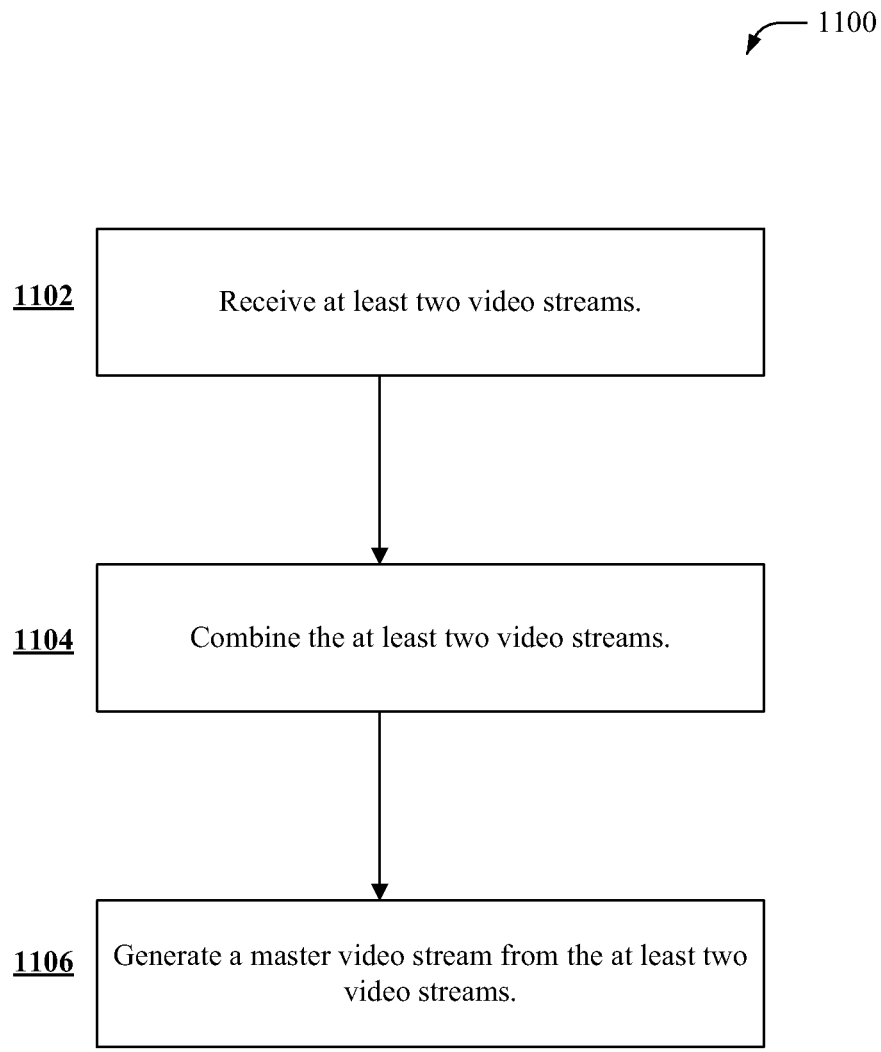
FIG. 11 illustrates an example non-limiting method for generating a master video stream, in accordance with various aspects and implementations described herein.
Figure 12:
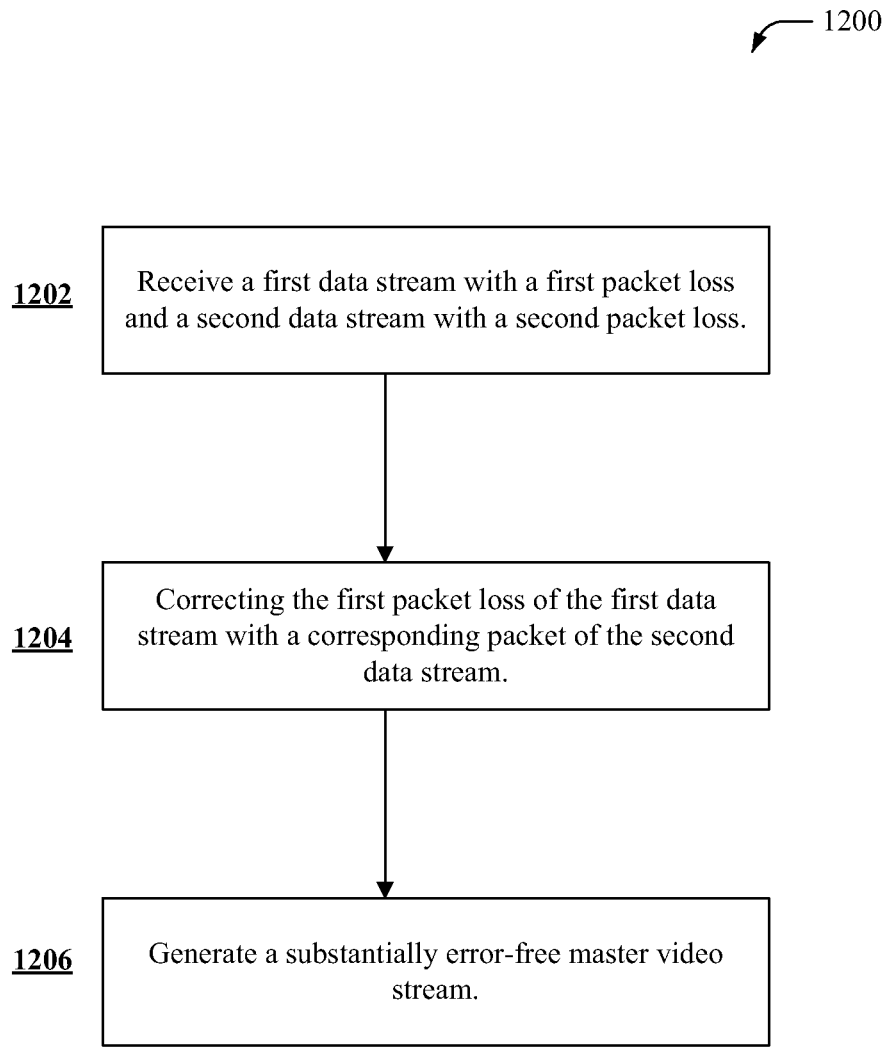
FIG. 12 illustrates an example non-limiting method for generating a substantially error-free master video stream from at least two live video streams that have suffered stream corruption or stream error, in accordance with various aspects and implementations described herein.
Figure 13:
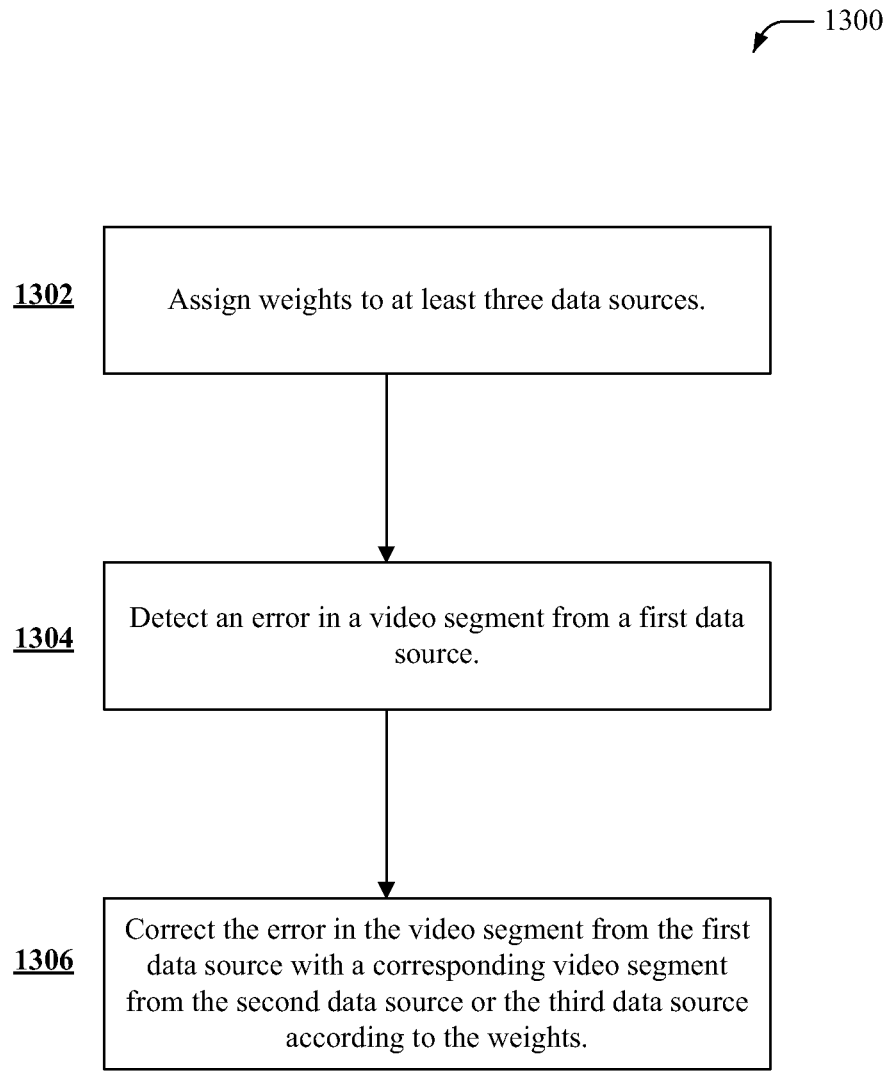
FIG. 13 illustrates an example non-limiting method for using weights assigned to video streams that have suffered stream corruption or stream error to generate a master video stream, in accordance with various aspects and implementations described herein.

FIGS. 11-13 illustrate methods and/or flow diagrams in accordance with implementations of this disclosure. For simplicity of explanation, the methods are depicted and described as a series of acts. However, acts in accordance with this disclosure can occur in various orders and/or concurrently, and with other acts not presented and described in this disclosure. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be further appreciated that the methods disclosed in this specification are capable of being stored on an article of manufacture to facilitate transporting and transferring such methods to computing devices. The term article of manufacture, as used in this disclosure, is intended to encompass a computer program accessible from any computer-readable device or computer-readable storage/communications media.

Referring to FIG. 11, presented is a flow diagram of an example application of systems described in this specification in accordance with an embodiment. In an aspect, example method 1100 of a system for generating a master video stream is stored in a memory and utilizes a processor to execute computer executable instructions to perform functions. At 1102, at least two live video streams are received (e.g., using a combination component 108). At 1104, the at least two live video streams are combined (e.g., using a combination component 108). At 1106, a master video stream is generated from the at least two live video streams (e.g., using a combination component 108).

Referring to FIG. 12, presented is a flow diagram of an example application of systems described in this specification in accordance with an embodiment. In an aspect, example method 1200 of a system for a substantially error-free master video stream from at least two live video streams that have suffered stream corruption or stream error is stored in a memory and utilizes a processor to execute computer executable instructions to perform functions. At 1202, a first data stream with a first stream corruption or stream error and a second data stream with a second stream corruption or stream error are received (e.g., using a stitcher 502 from data centers 820, 840, 860, 880). At 1204, the first stream corruption or stream error of the first data stream is corrected with a corresponding packet of the second data stream (e.g.

using a correction component 108 of a stitcher 502). At 1206, a substantially error-free master video stream is generated (e.g., by stitcher 502).

Referring to FIG. 13, presented is a flow diagram of an example application of systems described in this specification in accordance with an embodiment. In an aspect, example method 1300 of a system for using weights assigned to video streams that have suffered stream corruption or stream error to generate a master video stream is stored in a memory and utilizes a processor to execute computer executable instructions to perform functions.

At 1302, weights are assigned to at least three data sources (e.g., using a coordinator 802, 804, 806, or 808 at a data source 820, 840, 860 or 880). For example, the data source associated with the coordinator can be assigned the highest or default weight, while the other data sources can be assigned weights based on a number of parameters, such as location, reliability, load, or the like. At 1304, an error is detected in a video segment from one of the data sources (e.g., using a stitcher 502). At 1306, the error in the video segment is corrected with a corresponding video segment from one of the other data sources according to the weight (e.g., using the coordinator 802, 804, 806, or 808 and a recipe 810 from the stitcher 502).

Exemplary Networked and Distributed Environments

One of ordinary skill in the art can appreciate that the various embodiments described herein can be implemented in connection with any computer or other client or server device, which can be deployed as part of a computer network or in a distributed computing environment, and can be connected to any kind of data store where media may be found. In this regard, the various embodiments described herein can be implemented in any computer system or environment having any number of memory or storage units, and any number of applications and processes occurring across any number of storage units. This includes, but is not limited to, an environment with server computers and client computers deployed in a network environment or a distributed computing environment, having remote or local storage.

Creation of a substantially error-free master media stream from at least two media streams located at distributed data centers includes the exchange of information, cache storage and disk storage for objects, such as video streams or portions of video streams. In this regard, a variety of devices may have applications, objects or resources that may participate in the various embodiments of this disclosure.

Figure 14:
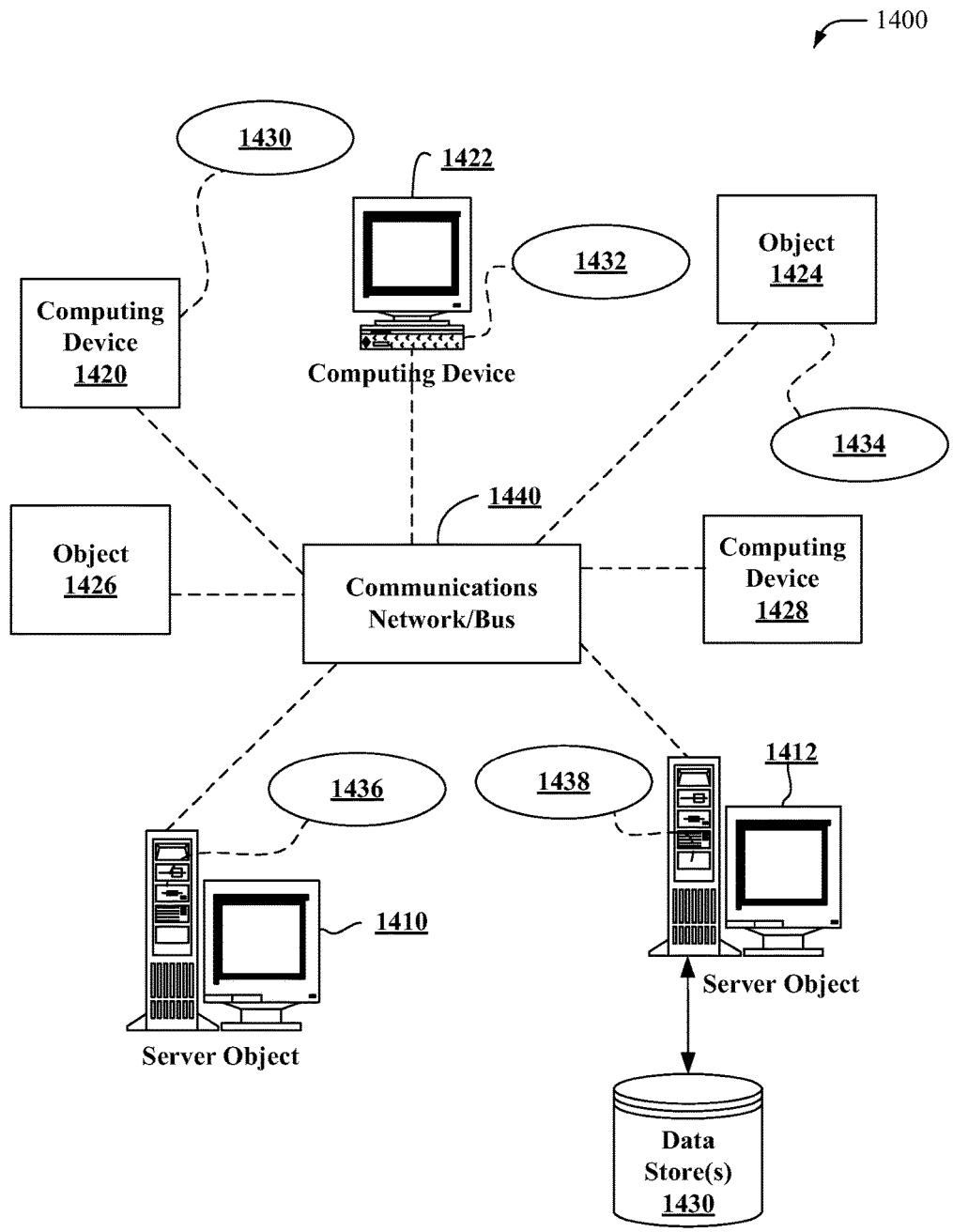
FIG. 14 illustrates a schematic diagram of an exemplary non-limiting networked or distributed computing environment for implementing one or more embodiments described herein.

FIG. 14 provides a schematic diagram of an exemplary networked or distributed computing environment in which embodiments described herein can be implemented. The distributed computing environment includes computing objects 1410, 1412, etc. and computing objects or devices 1420, 1422, 1424, 1426, 1428, etc., which can include programs, methods, data stores, programmable logic, etc., as represented by applications 1430, 1432, 1434, 1436, 14314. It can be appreciated that computing objects 1410, 1412, etc. and computing objects or devices 1420, 1422, 1424, 1426, 1428, etc. can include different devices, such as personal digital assistants (PDAs), audio/video devices, mobile phones, MPEG-1 Audio Layer 3 (MP3) players, personal computers, laptops, tablets, etc.

Each computing object 1410, 1412, etc. and computing objects or devices 1420, 1422, 1424, 1426, 1428, etc. can communicate with one or more other computing objects 1410, 1412, etc. and computing objects or devices 1420, 1422, 1424, 1426, 1428, etc. by way of the communications network 1440, either directly or indirectly. Even though illustrated as a single element in FIG. 14, communications network 1440 can include other computing objects and computing devices that provide services to the system of FIG. 14, and/or can represent multiple interconnected networks, which are not shown. Each computing object 1410, 1412, etc. or computing objects or devices 1420, 1422, 1424, 1426, 1428, etc. can also contain an application, such as applications 1430, 1432, 1434, 1436, 1438, that might make use of an application programming interface (API), or other object, software, firmware and/or hardware, suitable for communication with or implementation of the various embodiments of the subject disclosure.

There are a variety of systems, components, and network configurations that support distributed storage of media streams and creation of a substantially error-free master media stream. For example, computing systems can be connected together by wired or wireless systems, by local networks or widely distributed networks. Currently, many networks are coupled to the Internet, which provides an infrastructure for widely distributed computing and encompasses many different networks, though any network infrastructure can be used for exemplary communications made incident to the systems as described in various embodiments.

Thus, a host of network topologies and network infrastructures, such as client/server, peer-to-peer, or hybrid architectures, can be utilized. The client can be a member of a class or group that uses the services of another class or group. A client can be a computer process, e.g., roughly a set of instructions or tasks, that requests a service provided by another program or process. A client can utilize the requested service without having to know all working details about the other program or the service itself.

As used in this application, the terms "component," "module," "system," and the like are intended to refer to a computer-related entity, either hardware, software, firmware, a combination of hardware and software, software and/or software in execution. For example, a component can be, but is not limited to being, a process running on a processor, a processor, an object, an executable, a thread of execution, a program, and/or a computer. By way of illustration, both an application running on a computing device and/or the computing device can be a component. One or more components can reside within a process and/or thread of execution and a component can be localized on one computer and/or distributed between two or more computers. In addition, these components can execute from various computer-readable storage media having various data structures stored thereon. The components can communicate by way of local and/or remote processes such as in accordance with a signal having one or more data packets (e.g., data from one component interacting with another component in a local system, distributed system, and/or across a network such as the Internet with other systems by way of the signal).

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

In a client/server architecture, particularly a networked system, a client can be a computer that accesses shared network resources provided by another computer, e.g., a server. In the illustration of FIG. 14, as a non-limiting example, computing objects or devices 1420, 1422, 1424, 1426, 1428, etc. can be thought of as clients and computing objects 1410, 1412, etc. can be thought of as servers where computing objects 1410, 1412, etc. provide data services, such as receiving data from client computing objects or devices 1420, 1422, 1424, 1426, 1428, etc., storing of data, processing of data, transmitting data to client computing objects or devices 1420, 1422, 1424, 1426, 1428, etc., although any computer can be considered a client, a server, or both, depending on the circumstances. Any of these computing devices can process data, or request transaction services or tasks that can implicate the techniques for systems as described herein for one or more embodiments.

A server can be typically a remote computer system accessible over a remote or local network, such as the Internet or wireless network infrastructures. The client process can be active in a first computer system, and the server process can be active in a second computer system, communicating with one another over a communications medium, thus providing distributed functionality and allowing multiple clients to take advantage of the information-gathering capabilities of the server. Any software objects utilized pursuant to the techniques described herein can be provided standalone, or distributed across multiple computing devices or objects.

In a network environment in which the communications network/bus 1440 can be the Internet, for example, the computing objects 1410, 1412, etc. can be Web servers, file servers, media servers, etc. with which the client computing objects or devices 1420, 1422, 1424, 1426, 1428, etc. communicate via any of a number of known protocols, such as the hypertext transfer protocol (HTTP). Computing objects 1410, 1412, etc. can also serve as client computing objects or devices 1420, 1422, 1424, 1426, 1428, etc., as can be characteristic of a distributed computing environment utilized for distributed storage of media streams and the creation of a master video stream.

Exemplary Computing Device

Figure 15:
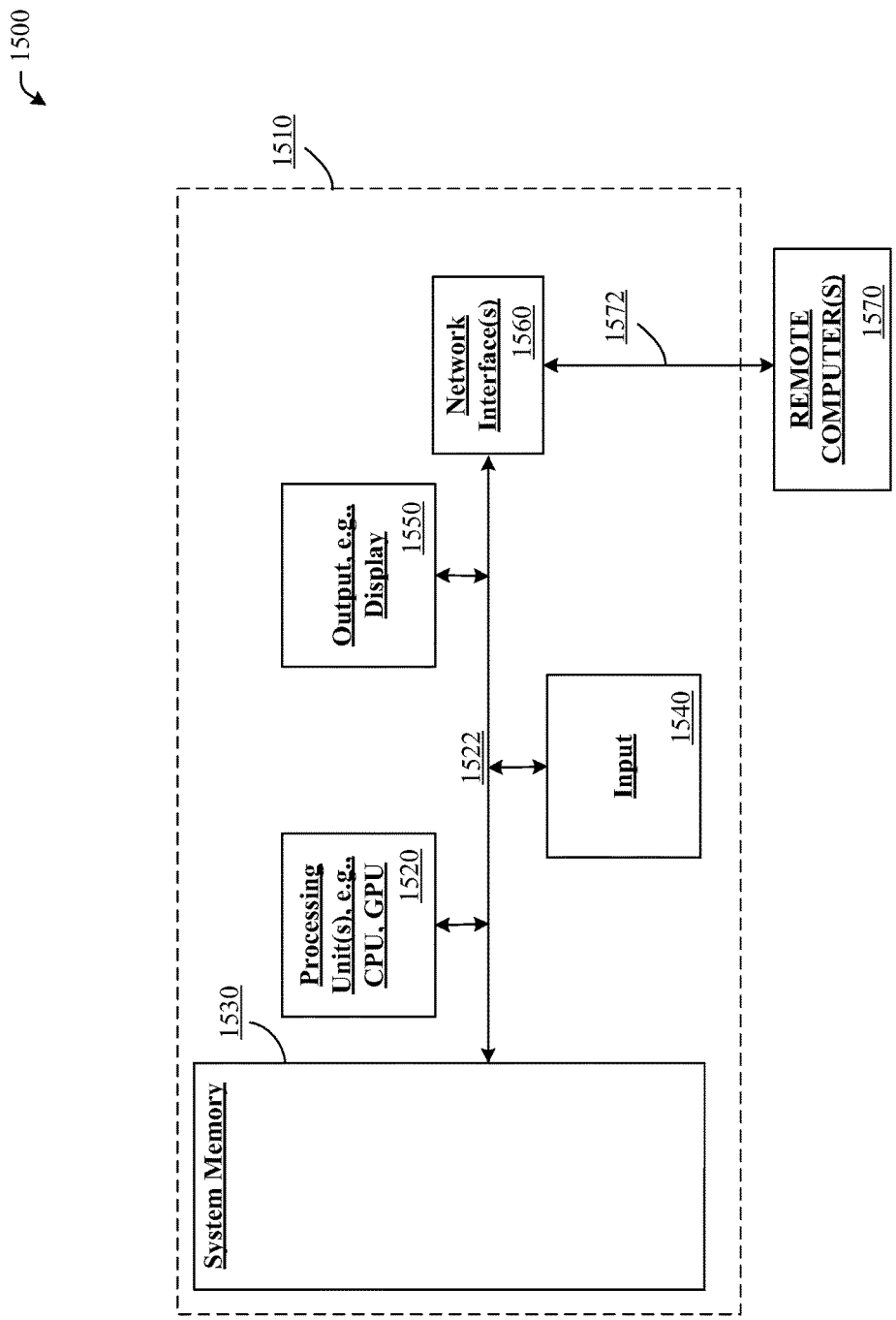
FIG. 15 illustrates a block diagram representing an exemplary non-limiting computing system or operating environment in which various embodiments can be implemented.

As mentioned, advantageously, the techniques described herein can be applied to any suitable device. It is to be understood, therefore, that handheld, portable and other computing devices and computing objects of all kinds are contemplated for use in connection with the various embodiments, i.e., anywhere that a device may wish to read or write transactions from or to a data store. Accordingly, the below remote computer described below in FIG. 15 is but one example of a computing device. Additionally, a suitable server can include one or more aspects of the below computer, such as a media server or other media management server components.

Although not required, embodiments can be partly implemented via an operating system, for use by a developer of services for a device or object, and/or included within application software that operates to perform one or more functional aspects of the various embodiments described herein. Software can be described in the general context of computer executable instructions, such as program modules, being executed by one or more computers, such as client workstations, servers or other devices. Those skilled in the art will appreciate that computer systems have a variety of configurations and protocols that can be used to communicate data, and thus, no particular configuration or protocol is to be considered limiting.

FIG. 15 thus illustrates an example of a suitable computing environment 1500 in which one or aspects of the embodiments described herein can be implemented, although as made clear above, the computing environment 1500 is only one example of a suitable computing environment and is not intended to suggest any limitation as to scope of use or functionality. Neither is the computing environment 1500 to be interpreted as having any dependency or requirement relating to any one or combination of components illustrated in the exemplary computing environment 1500.

With reference to FIG. 15, an exemplary computing environment 1500 for implementing one or more embodiments includes a computing device in the form of a computer 1510 is provided. Components of computer 1510 can include, but are not limited to, a processing unit 1520, a memory 1530, and a system bus 1522 that couples various system components including the system memory to the processing unit 1520. The system memory can store components, like the stitcher 502, the combination component 108, the coordinator 802, 804, 806, 808, and the like. The processor 1520 can facilitate execution of the components.

Computer 1510 typically includes a variety of computer readable media and can be any available media that can be accessed by computer 1510. The memory 1530 can include computer storage media in the form of volatile and/or nonvolatile memory such as read only memory (ROM) and/or random access memory (RAM). The data centers 820, 840, 860 and 880 can employ either volatile or nonvolatile memory or some combination thereof. By way of example, and not limitation, memory 1530 can also include an operating system, application programs, other program modules, and program data.

A user can enter commands and information into the computer 1510 through input devices 1540, non-limiting examples of which can include a keyboard, keypad, a pointing device, a mouse, stylus, touchpad, touch screen, trackball, motion detector, camera, microphone, joystick, game pad, scanner, video camera or any other device that allows the user to interact with the computer 1510. A monitor or other type of display device can be also connected to the system bus 1522 via an interface, such as output interface 1550. In addition to a monitor, computers can also include other peripheral output devices such as speakers and a printer, which can be connected through output interface 1550.

The computer 1510 can operate in a networked or distributed environment using logical connections to one or more other remote computers or remote data centers 820, 840, 860, 880, such as remote computer 1570. The remote computer 1570 can be a personal computer, a server, a router, a network PC, a peer device or other common network node, or any other remote media consumption or transmission device, and can include any or all of the elements described above relative to the computer 1510. The logical connections depicted in FIG. 15 include a network 1572, such local area network (LAN) or a wide area network (WAN), but can also include other networks/buses e.g., cellular networks.

As mentioned above, while exemplary embodiments have been described in connection with various computing devices and network architectures, the underlying concepts can be applied to any network system and any computing device or system in which it is desirable to publish or consume media in a flexible way.

Also, there are multiple ways to implement the same or similar functionality, e.g., an appropriate API, tool kit, driver code, operating system, control, standalone or downloadable software object, etc. which enables applications and services to take advantage of the techniques detailed herein. Thus, embodiments herein are contemplated from the standpoint of an API (or other software object), as well as from a software or hardware object that implements one or more aspects described herein. Thus, various embodiments described herein can have aspects that are wholly in hardware, partly in hardware and partly in software, as well as in software.

Computing devices typically include a variety of media, which can include computer-readable storage media and/or communications media, in which these two terms are used herein differently from one another as follows. Computer-readable storage media can be any available storage media that can be accessed by the computer, can be typically of a non-transitory nature, and can include both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, electrically erasable programmable read only memory (EEPROM), flash memory or other memory technology, compact disc read only memory (CD-ROM), digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

On the other hand, communications media typically embody computer-readable instructions, data structures, program modules or other structured or unstructured data in a data signal such as a modulated data signal (e.g., a carrier wave or other transport mechanism) and include any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, radio frequency (RF), infrared and other wireless media.

It is to be understood that the embodiments described herein can be implemented in hardware, software, firmware, middleware, microcode, or any combination thereof. For a hardware implementation, the processing units can be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors and/or other electronic units designed to perform the functions described herein, or a combination thereof. As it employed in this specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described in this disclosure. Processors can exploit nano-scale architectures such as, but not limited to, molecular and quantum-dot based transistors, switches and gates, in order to optimize space usage or enhance performance of user equipment. A processor may also be implemented as a combination of computing processing units.

When the embodiments are implemented in software, firmware, middleware or microcode, program code or code segments, they can be stored in a machine-readable medium (or a computer-readable storage medium), such as a storage component. A code segment can represent a procedure, a function, a subprogram, a program, a routine, a subroutine, a module, a software package, a class, or any combination of instructions, data structures, or program statements. A code segment can be coupled to another code segment or a hardware circuit by passing and/or receiving information, data, arguments, parameters, or memory contents. Information, arguments, parameters, data, etc. can be passed, forwarded, or transmitted using any suitable means including memory sharing, message passing, token passing, network transmission, etc.

For a software implementation, the techniques described herein can be implemented with modules or components (e.g., procedures, functions, and so on) that perform the functions described herein. The software codes can be stored in memory units and executed by processors. A memory unit can be implemented within the processor or external to the processor, in which case it can be communicatively coupled to the processor via various structures.

Reference throughout this specification to "one embodiment," or "an embodiment," means that a particular feature, structure, or characteristic described in connection with the embodiment is included in at least one embodiment. Thus, the appearances of the phrase "in one embodiment," or "in an embodiment," in various places throughout this specification are not necessarily all referring to the same embodiment. Furthermore, the particular features, structures, or characteristics may be combined in any suitable manner in one or more embodiments.

The words "example" or "exemplary" are used in this disclosure to mean serving as an example, instance, or illustration. Any aspect or design described in this disclosure as "exemplary" is not necessarily to be construed as preferred or advantageous over other aspects or designs. Rather, use of the words "example" or "exemplary" is intended to present concepts in a concrete fashion. In this specification, terms such as "data store," "buffer," and substantially any other information storage component relevant to operation and functionality of a component, refer to "memory components," or entities embodied in a "memory" or components comprising the memory. It will be appreciated that the memory components, or computer-readable storage media, described in this disclosure can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), and enhanced SDRAM (ESDRAM). Additionally, the disclosed memory components of systems or methods in this disclosure are intended to comprise, without being limited to comprising, these and any other suitable types of memory.

What has been described above includes examples of the embodiments of the present invention. It is, of course, not possible to describe every conceivable combination of components or methods for purposes of describing the claimed subject matter, but it is to be appreciated that many further combinations and permutations of this innovation are possible. Accordingly, the claimed subject matter is intended to embrace all such alterations, modifications, and variations that fall within the spirit and scope of the appended claims. Further, the order in which some or all of the process blocks appear in each process should not be deemed limiting. Rather, it should be understood that some of the process blocks can be executed in a variety of orders that are not illustrated in this disclosure. Moreover, the above description of illustrated embodiments of this disclosure, including what is described in the Abstract, is not intended to be exhaustive or to limit the disclosed embodiments to the precise forms disclosed. While specific embodiments and examples are described in this disclosure for illustrative purposes, various modifications are possible that are considered within the scope of such embodiments and examples, as those skilled in the relevant art can recognize.

In particular and in regard to the various functions performed by the above described components, modules, systems and the like, the terms used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the claimed subject matter. The aforementioned systems, devices, and circuits have been described with respect to interaction between several components and/or blocks. It can be appreciated that such systems, devices, circuits, and components and/or blocks can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it should be noted that one or more components may be combined into a single component providing aggregate functionality or divided into several separate sub-components, and any one or more middle layers, such as a management layer, may be provided to communicatively couple to such sub-components in order to provide integrated functionality. Any components described in this disclosure may also interact with one or more other components not specifically described in this disclosure but known by those of skill in the art.

In addition, while a particular feature of this innovation may have been disclosed with respect to only one of several implementations, such feature may be combined with one or more other features of the other implementations as may be desired and advantageous for any given or particular application. Furthermore, to the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

What is claimed is:

1. A computer-implemented method of streaming video, the method comprising:
    receiving a plurality of live video streams of an event from a plurality of data sources:
    assigning, for each respective data source, a weight based on at least an originating location associated with each respective data source:
    identifying, for a live video stream from the plurality of live video streams, errors and error-free segments included in the live video stream;
    identifying, for each identified error segment from the live video stream, a corresponding error-free segment included in another live video stream from the plurality of live video streams;
    selecting, the identified error-free segments included in the other live video streams to replace the identified error segments from the live video stream based on the weights assigned to data sources corresponding to the other live video streams:
    combining the identified error-free segments included in the live video stream and the selected error-free segments from the other live video streams to generate a master video stream that lacks error segments; and
    publishing the master video stream responsive to the combination of the identified error free segments included in the live video stream and the selected error-free segments from the other live video streams.

2. The computer-implemented method of claim 1, wherein an error segment from the live video stream is missing or corrupt.

3. The computer-implemented method of claim 1, wherein identifying the corresponding error-free segment comprises:
    synchronizing the live video stream and other live video streams of the plurality of live video streams.

4. The computer-implemented method of claim 3, wherein synchronizing comprises:
    matching fingerprints of segments of the live video stream with fingerprints of segments included in the other live video streams.

5. The computer-implemented method of claim 4, wherein each fingerprint includes metadata associated with a set of data packets of the segment that is associated with the fingerprint.

6. The computer-implemented method of claim 5, wherein the metadata includes a hash code of each segment and wherein matching fingerprints comprises:
    comparing hash codes of the segments of the live video stream with hash codes of the segments of the other live video streams to identify matching pairs of segments; and retrieving a corresponding error-free segment for each matching pairs of segments responsive to the identification of the matching pairs of segments.

7. The computer-implemented method of claim 3, further comprising:
    matching the segments of the live video stream with the segments of the other live video streams using video content based similarity metrics.

8. A computer program product comprising a non-transitory computer-readable storage medium storing executable code for streaming video, the code when executed causes one or more computer processors to perform steps comprising:

receiving a plurality of live video streams of an event from a plurality of data sources:

assigning, for each respective data source, a weight based on at least a reliability value associated with each respective data source:

identifying, for a live video stream from the plurality of live video streams, errors and error-free segments included in the live video stream;

identifying, for each identified error segment from the live video stream, a corresponding error-free segment included in another live video stream from the plurality of live video streams;

selecting, the identified error-free segments included in the other live video streams to replace the identified error segments from the live video stream based on the weights assigned to data sources corresponding to the other live video streams;

combining the identified error-free segments included in the live video stream and the selected error-free segments from the other live video streams to generate a master video stream that lacks error segments; and publishing the master video stream responsive to the combination of the identified error-free segments included in the live video stream and the selected error-free segments from the other live video streams.

9. The computer program product of claim 8, wherein an error segment from the live video stream is missing or corrupt.

10. The computer program product of claim 8, wherein identifying the corresponding error-free segment comprises:

synchronizing the live video stream and other live video streams of the plurality of live video streams.

11. The computer program product of claim 10, wherein synchronizing comprises:

matching fingerprints of segments of the live video stream with fingerprints of segments included in the other live video streams.

12. The computer program product of claim 11, wherein each fingerprint includes metadata associated with a set of data packets of the segment that is associated with the fingerprint.

13. The computer program product of claim 12, wherein the metadata includes a hash code of each segment and wherein matching fingerprints comprises:

comparing hash codes of the segments of the live video stream with hash codes of the segments of the other live video streams to identify matching pairs of segments; and retrieving a corresponding error-free segment for each matching pairs of segments responsive to the identification of the matching pairs of segments.

14. The computer program product of claim 10, wherein the code when executed by the one or more computer processors further causing the one or more processors to perform steps comprising:

matching the segments of the live video stream with the segments of the other live video streams using video content based similarity metrics.

15. A computer system for streaming video, the computer system comprising:

one or more computer processors; and a non-transitory computer-readable storage medium storing executable code, the code when executed causes one or more computer processors to perform steps comprising:

receiving a plurality of live video streams of an event from a plurality of data sources:

assigning, for each respective data source, a weight based on at least a load associated with each respective data source;

identifying, for a live video stream from the plurality of live video streams, errors and error-free segments included in the live video stream;

identifying, for each identified error segment from the live video stream, a corresponding error-free segment included in another live video stream from the plurality of live video streams;

selecting, based on a weight associated with each of the other live video streams, the identified error-free segments included in the other live video streams to replace the identified error segments from the live video stream based on the weights assigned to data sources corresponding to the other live video streams;

combining the identified error-free segments included in the live video stream and the selected error-free segments from the other live video streams to generate a master video stream that lacks error segments; and publishing the master video stream responsive to the combination of the identified error-free segments included in the live video stream and the selected error-free segments from the other live video streams.

16. The computer system of claim 15, wherein an error segment from the live video stream is missing or corrupt.

17. The computer system of claim 15, wherein identifying the corresponding error-free segment comprises:

synchronizing the live video stream and other live video streams of the plurality of live video streams.

\* \* \* \* \*